Jan. 29, 1929.

C. B. MILES 1,700,235

LOCOMOTIVE HEADLIGHT

Filed March 16, 1927

Inventor
CLARENCE B. MILES,

By Schley Frash

Attorneys

Patented Jan. 29, 1929.

1,700,235

UNITED STATES PATENT OFFICE.

CLARENCE B. MILES, OF OMAHA, NEBRASKA.

LOCOMOTIVE HEADLIGHT.

Application filed March 16, 1927. Serial No. 175,695.

My invention is concerned with headlights for railroad locomotives and particularly with headlights for locomotives employed for switching purposes. Such locomotives are usually provided at each end with a step on which brakemen and switchmen frequently ride. Persons boarding locomotives of this type frequently get on while the locomotive is in motion, and some danger is involved in this practice at night when the locomotive headlight fails to provide sufficient illumination of the step and hand rails. The danger is increased by reason of the fact that the locomotive headlight throws a powerful concentrated light-beam which makes vision toward the locomotive difficult.

It is the object of my invention to illuminate the step and hand rails of the locomotive to such an extent that they are clearly visible at night. It is a further object of my invention to obtain this result without the necessity for any independent or additional light-sources.

I accomplish the above objects by supporting in the light-beam from the locomotive head light a mirror which will deflect onto the step and other parts of the locomotive a small fraction of the light emitted from the head light.

Figure 1:
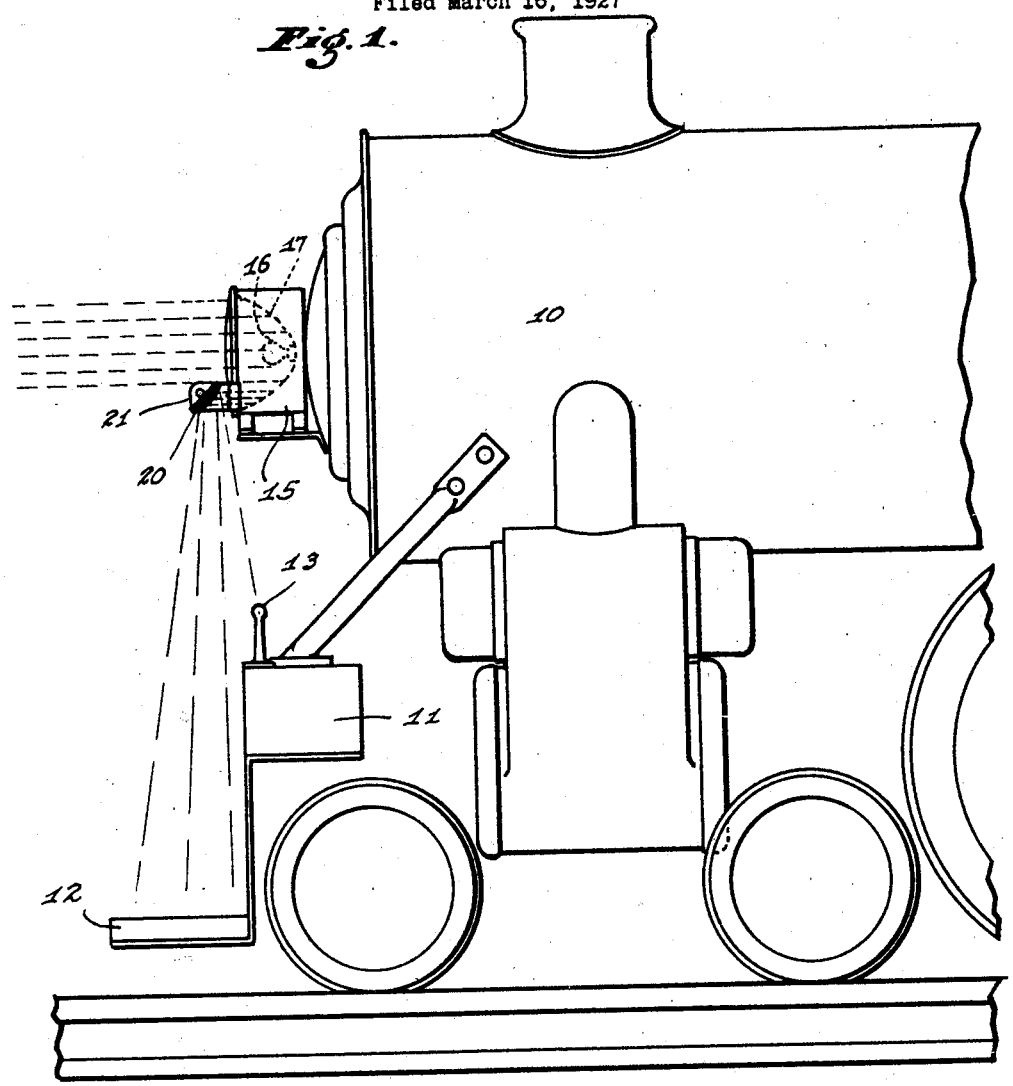
Figure 2:
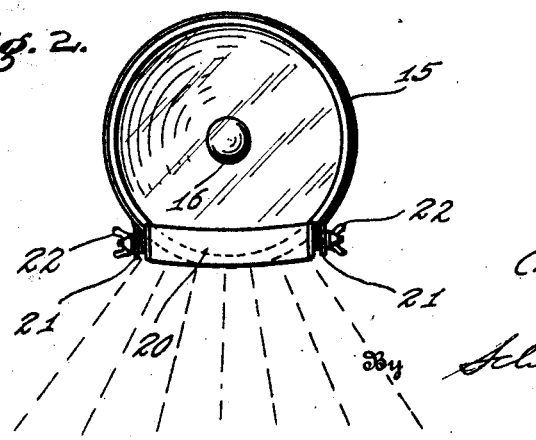

The accompanying drawing illustrates my invention: Fig. 1 is a side elevation of a locomotive equipped with a head light embodying my invention, and Fig. 2 is a front elevation of my improved type of headlight.

The locomotive 10 shown in the drawings has the usual bumper-beam 11, step 12, and hand rail 13. My invention is not directly concerned with the type of locomotive or with the arrangement of the bumper beam, step, or hand rail.

Mounted on the locomotive is a headlight 15 which may be of any desired type but which commonly includes a light bulb 16 located at the focus of a parabolic reflector 17 so that a beam of light consisting of substantially parallel rays is produced.

In carrying out my invention, I support in front of the headlight and in the path of the beam of light emitted therefrom a mirror 20. This mirror 20 may be mounted in any desired fashion, but I prefer to support it in brackets 21 which project forwardly from the front of the headlight 17. The mirror 20 may have a trunnion mounting in such brackets in order that it may be angularly adjusted to provide illumination at the points desired. The mirror may be held in any of its positions of adjustment by means of thumb-nuts 22.

To insure that the light reflected from the mirror 20 will reach all parts of the step 12, I preferably make the mirror 20 so that it is convex both in a vertical plane and in a horizontal plane in order that the parallel rays of light incident upon it will, when reflected, diverge both in a longitudinal and in a transverse plane.

By my invention, I provide illumination for the bumper 11, step 12, and hand rail 13 of the locomotive, thus making such parts clearly visible after dark and decreasing the danger involved in boarding a locomotive in motion. By utilizing the light emitted from an ordinary headlight, I eliminate the necessity for any independent or additional light source.

I claim as my invention:—

1. In combination with a locomotive having a transverse step, bumper beam, and hand rail, a headlight mounted on the locomotive above said bumper beam, a bracket mounted at the bottom of said headlight and extending forwardly therefrom, and a mirror pivotally mounted on a horizontal axis in said bracket, said mirror being located in the bottom part of the path of the beam of light emitted from said headlight and in position to reflect a portion of the light from said headlight downwardly and rearwardly to illuminate said step, bumper beam, and hand rail over an area materially larger than that of the mirror, said mirror being convex in order that the light rays reflected from it will diverge.

2. In combination with a locomotive having a transverse step, bumper beam, and hand rail, a headlight mounted on the locomotive above said bumper beam, a bracket mounted at the bottom of said headlight and extending forwardly therefrom, and a mirror pivotally mounted on a horizontal axis in said bracket, said mirror being located in the bottom part of the path of the beam of light emitted from said headlight and in position to reflect a portion of the light from said headlight downwardly and rearwardly to illuminate said step, bumper beam, and hand rail over an area materially larger than that of the mirror.

3. In combination with a locomotive having a transverse step, bumper beam, and hand rail, a headlight mounted on the locomotive above said bumper beam, and a mirror supported in front of said headlight in the lower part of the beam of light emitted therefrom and in position to reflect a portion of the light from said headlight downwardly and rearwardly to illuminate said step, bumper beam, and hand rail over an area materially larger than that of the mirror.

In witness whereof, I have hereunto set my hand at Omaha, Nebraska, this 11th day of March, A. D. one thousand nine hundred and twenty seven.

CLARENCE B. MILES.